2,941,012
PREPARATION OF TETRAFLUOROETHYLENE

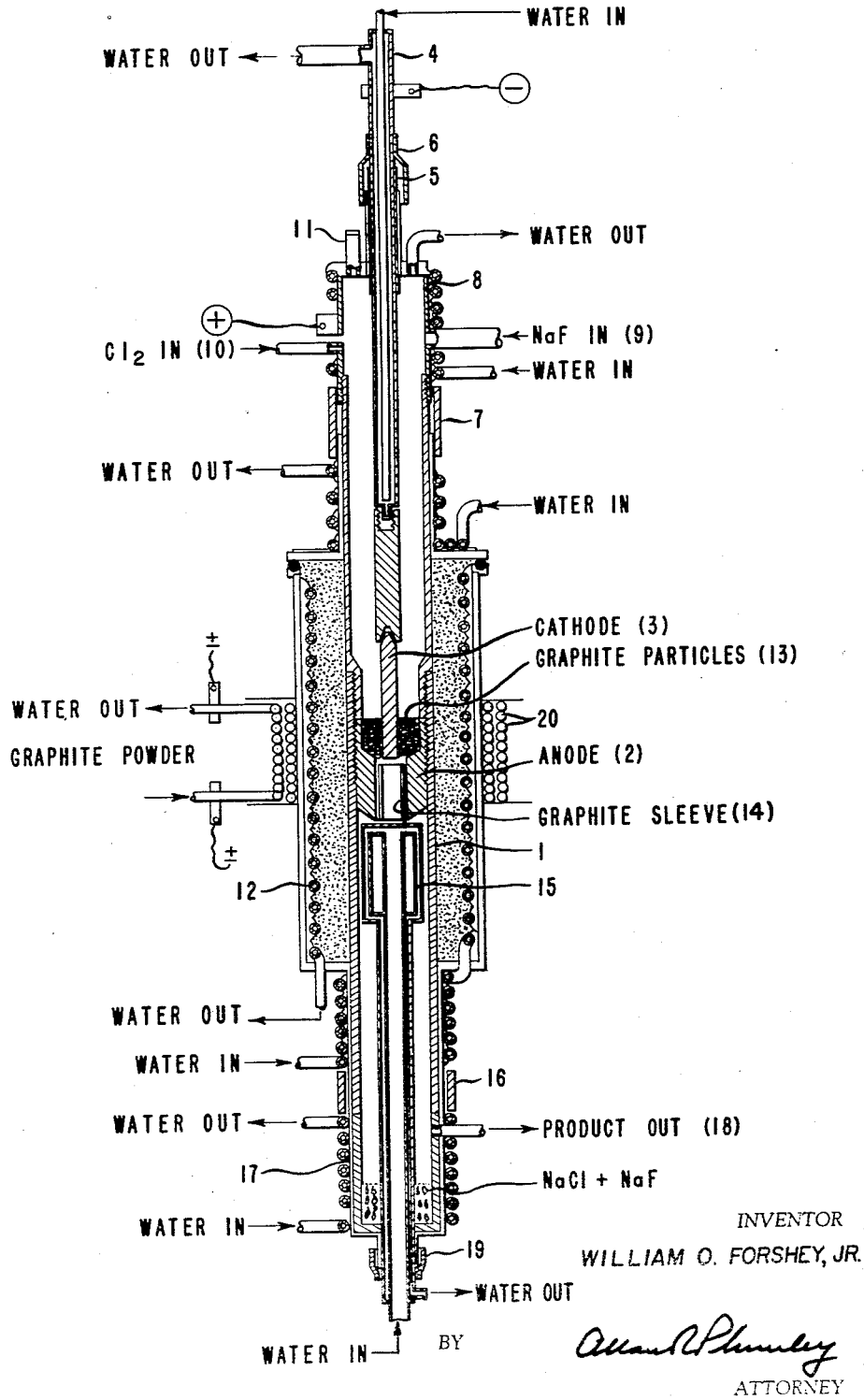

William Osmond Forshey, Jr., New Castle, Del., assignor to E. I. du Pont de Nemours and Company, Wilmington, Del., a corporation of Delaware Filed Apr. 23, 1958, Ser. No. 730,382

5 Claims. (Cl. 260—653.3)

This invention relates to a new process of synthesizing tetrafluoroethylene.

Tetrafluoroethylene is a chemical of considerable industrial importance, particularly in the form of its polymers, whose fields of application are constantly broadening. New and better methods of synthesizing tetrafluoroethylene as economically as possible are an important goal of chemical research. A good synthesis of tetrafluoroethylene is described in U.S. Patent 2,709,192, issued May 24, 1955 to M. W. Farlow. It involves the reaction of carbon tetrafluoride or hexafluoroethane with carbon at temperatures of at least 1700° C. followed by rapid quenching of the gaseous reaction product. This process is very satisfactory, but it requires separate preparation and storage of the fluorocarbons which serve as starting materials. A simpler method not involving these steps is desirable.

In accordance with this invention, tetrafluoroethylene is prepared by a process which comprises (a) passing through carbon at a temperature of at least 1200° C. a mixture of chlorine with a fluoride of an alkali metal of atomic number 11 to 19 (i.e., sodium or potassium fluoride), the molar ratio of the alkali metal fluoride to the chlorine being in the range of at least 4:1 to about 20:1, and the carbon being present in the ratio of at least one gram atom per mole of chlorine; (b) passing the effluent product without allowing it to cool down through a zone maintained at a temperature of at least 2000° C.; (c) immediately thereafter bringing the effluent gaseous product in contact with carbon at a temperature above the boiling point of the alkali metal fluoride; (d) quenching the effluent gaseous reaction product to a temperature below 500° C. within 0.1 second, the whole process being conducted at an absolute pressure not exceeding 100 mm. of mercury; and (e) isolating the gaseous halocarbons produced.

The reactions embodied in the process of the present invention take place in three successive hot zones. The methods and means by which these hot zones are obtained are not critical to the invention and various means known in the art may be employed. Thus for the high temperatures required in the intermediate hot zone (Step b) there may be employed such means as induction furnaces, resistance furnaces and electric arcs. The most convenient method of carrying out the process of the present invention is by use of an electric carbon arc in the intermediate hot zone. The reactants are passed through the arc flame or plasma where the temperature is above 2000° C. and believed to be as high as 4000° C. or even higher. The heat given off by such an arc flame may be conveniently used to heat the remaining reaction zones. Since a carbon arc is the preferred and most practical source of the high temperatures employed in the intermediate heating step of this process, the invention for purposes of better understanding is described in terms of a carbon arc as the intermediate heat zone although other sources of high temperatures can be substituted for the carbon arc.

The reactions which take place in the successive steps of this process are not clearly understood. In Step (a) wherein chlorine and the alkali metal fluoride come in contact with hot carbon, it is probable that some carbon tetrafluoride is initially formed at the point where the carbon is at a temperature between 1200° C. and the boiling point of the alkali metal fluoride (1500–1700° C.) since it has been found that, under such conditions, although with a lower alkali metal fluoride/chlorine ratio, carbon tetrafluoride is produced in excellent yields. However, in the hotter portions (that is, those nearer the arc) of the carbon bed, and in the arc zone itself, where any carbon tetrafluoride and other carbon-fluorine compounds or fragments present are exposed to extremely high temperatures in the presence of molecules and ions from the alkali metal fluoride and chloride, further reactions of an unknown nature take place. This is shown by the fact that, when the gaseous mixture emerging from the arc zone is quenched directly, without further contact with hot carbon, that is, when Step (c) is omitted, the reaction product is found to consist, not of carbon tetrafluoride as might have been expected, but chiefly of chlorofluorocarbons. No tetrafluoroethylene is present. Conversely, when Step (a) is omitted, other conditions being the same, that is, when the alkali metal fluoride/chlorine mixture is passed directly through the carbon arc, followed by immediate contact with hot carbon as in Step (c), then quenching, the reaction product is found to consist of carbon tetrafluoride and chlorotrifluoromethane in approximately equal amounts, with no tetrafluoroethylene. It has also been established that certain reactions of an unknown nature involving carbon-fluorine fragments or radicals take place on instantaneous cooling of the gaseous mixture since it has been found that this same succession of steps, but without rapid quenching, gives nearly pure carbon tetrafluoride.

It has been found that, in Step (a) wherein carbon is reacted with chlorine and the alkali metal fluoride, an excess of the latter over the amount calculated from the theoretical equation $4MF+2Cl_2+2C \rightarrow CF_2=CF_2+4MCl$ is necessary in order that tetrafluoroethylene be formed. There should be used at least 4 moles of alkali metal fluoride per mole of chlorine. It is, however, unnecessary and uneconomical to use more than 20 moles of alkali metal fluoride per mole of chlorine, the preferred ratio $MF/Cl_2$ (where M stands for Na or K) being from 5:1 to 15:1. There should be used at least one gram atom of carbon per mole of chlorine, and preferably there is used from 2 to 10 gram atoms of carbon or even more. The carbon bed through which the reactants pass should be at a temperature of at least 1200° C. throughout its length. The carbon bed is normally located immediately adjacent to the carbon arc which follows it, and under these conditions there is a temperature gradient within the carbon bed from the point where the reactants enter it, which should be at at least 1200° C., to the point close to the arc where the reaction products leave the carbon bed, this point being at a higher temperature which may reach or even exceed 2000° C. The necessary temperature is normally maintained by the heat radiating from the arc, although a suitable additional heat source can be used if the arc is not located close enough to the carbon mass to keep it at the desired temperature.

The product emerging from the first hot carbon bed (molten or vaporized alkali metal fluoride with whatever carbon-containing entities or fragments have been formed) then enters the hot zone of the carbon arc before it has cooled to a temperature appreciably below that of the carbon bed, and in any event while its temperature is still at least 1200° C. The form of the carbon arc to be used in this process is not critical, so long as the apparatus is so constructed that the conditions stated above are fulfilled. Thus, for example, improved types of carbon arcs of the kind illustrated in the aforementioned U.S. Patent 2,709,192, can be used, with suitable modifications to provide for contact with hot carbon before and after the arc zone and to provide for immediate quenching of the gas emerging therefrom.

An especially suitable type of electric arc for use in this process is a magnetically rotated carbon arc. In comparison with static arcs of conventional design, or even with the improved arcs of the kind mentioned above, a rotating arc is far more efficient by virtue of its much greater stability and because of the far better contact between arc and reactants that it permits. A particularly efficient form of rotating arc, which was used in the example described below, operates as follows.

The reactants (in this case, the molten, gaseous or volatilized products and reactive fragments or radicals emerging from the hot carbon bed) pass through a symmetrical annular gap formed by a substantially cylindrical solid graphite cathode, and a substantially cylindrical hollow graphite anode, wherein a continuous electrical discharge is rotated by magnetic lines of flux essentially parallel to the axis of rotation of the annular arc. This causes the arc to move at right angle to the magnetic field lines. The magnetic field is created by surrounding the arc chamber with a coil through which is current (preferably a direct current) passes. A field strength sufficient to cause rotation is 100–200 gauss. The arc rotates extremely rapidly in the annular gap between the electrodes, its speed being estimated at 1,000 to 10,000 revolutions per second, and it heats the reactants very uniformly to extremely high temperatures as they pass through the gap. The gaseous reaction product leaves the arc chamber through the hollow anode and comes immediately in contact with the second source of hot carbon.

The electrical characteristics of the rotating arc are essentially similar to those of a linear arc. Thus, operating conditions of the arc may be varied over a wide range from the minimum voltage required to maintain the arc to very high voltages, e.g., in the range of 10 to 75 volts. In general, for a given current the required voltage of the arc is determined by the pressure in the system, the width of the arc gap, and the nature of the gases present in the arc chamber. The power requirements will, of course, depend on the quantity of reactants passed through the rotating arc and the temperature to which they are to be heated.

The arc may be operated with a direct current or with an alternating current if the alternating current is of high frequency and is employed in combination with an alternating magnetic field which is in phase with the arc current. A direct current is greatly preferred, since only with a direct current is it possible to obtain a truly continuous rotating arc resulting in uniform heating and high stability. Current intensities in the range of 20 to 500 amperes are generally used. Suitable provisions can be made to maintain the electrodes in approximately the same relative position, that is, to compensate for any loss of carbon from the electrodes which may take place by reaction with the gaseous mixture passing through the arc.

Immediately after passing through the arc zone, the resulting gaseous and vaporized products are brought in contact with carbon at a temperature above the boiling point of the alkali metal fluoride. At atmospheric pressure, this temperature is about 1700° C. for sodium fluoride and about 1500° C. for potassium fluoride, although these values are in this case somewhat lower in view of the fact that the operation is carried out at subatmospheric pressure. In practice, however, the temperature of the post-arc carbon is at least 1700° C., and it can be as high as 2000° C. or more. This temperature is maintained without additional heat input by the heat radiated from the arc, since the latter is as close to the carbon mass as the shape of the apparatus permits, and by the heat of the gases emerging from the arc. The carbon mass can be of any suitable shape. For example, a graphite sleeve can be inserted in the hollow electrode through which the gases leave the arc zone, so that the gases pass through a very narrow gap, thus coming in contact with the hot graphite walls surrounding it. Alternatively, a perforated graphite plate, with or without graphite particles supported on it, can be inserted at the eixt end of the hollow electrode in the path of the outgoing gases.

The last chemical action in this process takes place when the gaseous reaction product, after contact with the hot carbon, is quickly and suddenly cooled by means of a suitable quenching element. The form or mode of operation of the quenching element is largely immaterial, but its effectiveness should be such that the gaseous reaction product is brought down to a temperature not exceeding 500° C. within not more than 0.1 second after passing through the carbon mass subsequent to the arc zone. Preferably, the time of transition from the temperature maintained in the carbon mass to about 500° C. should be in the range of 0.001 to 0.02 second. If this quenching step is omitted, other conditions being the same, the final reaction product contains essentially no tetrafluoroethylene.

The quenching element can be, for example, any suitably designed metal surface kept at a low temperature by means of a circulating cooling liquid, the off-gas coming in contact with this surface immediately after leaving the hot zones. Thus, for example, the gases can be drawn inside a double walled copper pipe, having essentially the form of an ordinary condenser through which cold water is circulated. A more effective quenching element consists of a hollow, double walled copper cylinder connected to an internal, concentric double walled copper pipe through several radial tubes or fins, with cold water circulating through this assembly. The hot gases in passing through the hollow cylinder make good contact with its inside walls and with the outside walls of the centrally located tube and of the fins radiating therefrom. This type of quenching unit was used in the example which follows. The sufficiency of a particular quenching system is readily established by measurements of gas temperature at known distances from the arc zone, the flow of the gaseous product being calculated from the quantities of product obtained and the pressure of the system.

The entire process should be carried out under reduced pressure, both for the reasons that the electric arc operates better and that rapid quenching is facilitated at low pressures. Absolute pressures within the reactor of the order of 100 mm. of mercury or less are suitable, the preferred pressure range being that from 5 to 50 mm. of mercury.

For better quenching, it is desirable to adjust the rate of flow of the chlorine, and therefore also of the alkali metal fluoride, so that the absolute pressure in and before the first hot carbon bed is somewhat higher than that in the quenching element. For example, the inlet pressure in the system can be in the range of 20 to 100 mm., preferably 20 to 50 mm., and the outlet pressure can be in the range of 5 to 40 mm., preferably 5 to 15 mm.

The contact time between the reactants depends on the design of the apparatus, on the method of operation and on the absolute pressure within the system. It is known that at the high temperatures employed a very short contact time is sufficient. It can be said in general that, at the operating pressure, the contact time between the reactants at reaction temperature can be as short as 0.001 second and should not exceed about 0.1 second.

After quenching, the gaseous reaction products (tetrafluoroethylene and other halocarbons) are withdrawn from the reactor and passed through one or more traps maintained at low temperature, e.g., that of liquid nitrogen, where the condensable materials are collected. The reactor is connected through the cold traps to a vacuum pump which maintains the desired pressure in the system and serves to evacuate the volatile products. The solid reaction products, that is, the alkali metal chloride formed and the unchanged alkali metal fluoride, condense in the cold portion of the reactor and collect in a suitable receiver.

The inorganic reactants used in this process, i.e., the alkali metal fluoride and the chlorine, need no special purification. However, they should be substantially anhydrous since the presence of more than minor amounts of water is detrimental to the reaction. Any form of carbon, whether amorphous or crystalline, is suitable for the carbon beds. Thus, there can be used anthracite, graphite, charcoal or the various forms of carbon black. Smaller amounts of by-products are obtained when the carbon is as free as possible from hydrocarbon impurities and silicon. However, the carbon need not be rigorously pure. When a carbon arc is employed some of the carbon entering into the reaction may be furnished by the electrodes which are usually made of amorphous carbon or graphite. The material of which these electrodes are made need not be especially purified. It is only necessary that its electrical conductivity be sufficiently high.

The product obtained by the process of this invention is a mixture of fluorocarbons and chlorofluorocarbons. Besides tetrafluorethylene, it contains in variable amounts carbon tetrafluoride, chlorotrifluoromethane and dichlorodifluoromethane. Hexafluoroethane is sometimes present in small amounts, and trichlorofluoromethane, chloropentafluoroethane and dichlorotetrafluoroethane may be present in trace amounts. By-products, such as silicon tetrafluoride, hydrogen chloride and carbon dioxide are often found in small amounts, these being formed either from moisture and impurities which are difficult to remove from the reactants or from impurities in the graphite insulation normally used around the reactor. These by-products can readily be separated from the halocarbons by washing the reaction product with water or aqueous alkali. The halocarbon mixture can be separated into its various components by fractional distillation in a low temperature still. It should be observed that the halocarbons formed besides tetrafluoroethylene are also very valuable technically. Thus, carbon tetrafluoride and the chlorofluorocarbons find uses as refrigerant liquids, dielectric fluids and ingredients of aerosol compositions. Carbon tetrafluoride is furthermore the starting material in the tetrafluoroethylene synthesis described in the aforementioned U.S. Patent 2,709,192.

The drawing is a vertical section showing schematically one form of reactor suitable for use in this invention. The particular apparatus illustrated is a rotating electric arc embodying the principle discussed above.

Briefly described, the reactor comprises essentially a 2⅝" vertical graphite tube 1 into which is threaded an anode 2 consisting of a graphite insert with a 1" hole around the vertical center line. The graphite tube with its insert constitutes one of the electrodes. The other electrode (cathode) is a solid ½" graphite rod 3 mounted on a cathode holder 4 which is a water-cooled copper pipe electrically insulated from the tube reactor by a polytetrafluoroethylene bushing 5, and held thereon through a vacuum tight rubber seal 6. The lower end of the cathode 3 is concentric with the anode insert 2 and essentially flush with the upper part of it, so that the arc flame is located in the annular space between anode and cathode. The graphite tube 1 is connected through a vacuum tight rubber seal 7 to a water-cooled copper head 8 through the center of which passes the bushing 5 surrounding the cathode holder 4. The head 8 is provided with an inlet tube 9 through which the solid alkali metal fluoride is introduced at a predetermined rate by means of a worm injector (not shown). The head 8 is also provided with a gas inlet tube 10 through which chlorine is introduced through a flowmeter (not shown), if desired with an inert gas diluent and carrier such as nitrogen or helium. A sight tube 11 is also provided at the top of the head 8 to permit visual inspection of the arc.

The graphite tube 1 is enclosed in a water-cooled copper jacket 12 containing approximately 1½" of graphite powder insulation around the arc proper.

The hot carbon mass before the arc zone is provided by a bed of graphite particles 13 surrounding the end of the cathode 3 and resting on a 2" long graphite sleeve 14 inserted within the anode 2 and flush with the top of the anode. The sleeve insert 14 is of such a size that the arc gap is ⅙₁₆" in length, and it forms below the arc flame a narrow cylindrical passage through which the gases emerging from the arc zone must travel, and where they come in intimate contact with hot carbon.

Immediately upon emerging from the hot graphite sleeve 14, the gaseous products come in contact with a water-cooled copper quenching element 15, where they are cooled suddenly to below 500° C.

The lower section of the reactor tube 1 below the copper jacket 12 is additionally cooled by means of water circulating in a coil wrapped around the graphite tube, and the reaction products non-volatile at this lower temperature (alkali metal fluoride and alkali metal chloride) condense as solids in this portion of the tube and around the quenching element. To the lower end of reactor tube 1 is attached, through a vacuum-tight rubber seal 16, a water-cooled graphite liner 17 at the bottom of which the said solid reaction products collect. The liner 17 is provided with an outlet tube 18 through which the gaseous reaction products (halocarbons) leave the reactor and with a vacuum-tight rubber seal 19 through which the quenching element 15 enters the reactor. The gaseous reaction products are led to a collection system (not shown) of cold traps where they condense. Reduced pressure is applied to the entire assembly through the gas collection system by means of a vacuum pump (not shown).

In the apparatus shown, the arc is rotated by means of an electromagnetic field. This field is generated by a D.C. current through the rotator coil 20, supported on a copper frame outside the copper jacket 12 around the arc portion of the reactor. The coil is constructed of 51 turns of ³⁄₁₆" copper tubing, electrically insulated by fiberglass sleeve insulation and it is internally water-cooled during operation to prevent overheating due to the high currents used (50–200 amperes).

In operating this equipment, the entire reaction system is evacuated to less than 0.2 mm. of mercury through the gas collection system with the inlet tubes closed. An inert gas, e.g., nitrogen, is then bled into the system through the inlet to the reactor head to a pressure of approximately 10–15 mm. of mercury. The power unit is then activated to supply the rotating field current, the arc is established between the electrodes and the arc current adjusted to the correct value. The pressure inside the reactor is then adjusted to the final operating pressure. After the equipment has been operating satisfactorily at the desired current levels for 10–20 minutes, during which time the carbon masses before and after the arc zone reach the proper temperature, the feed of alkali metal fluoride and chlorine to the reactor is commenced. The product gases are condensed in the collection system, where the traps are cooled with liquid nitrogen. At the end of the desired operating period, the feeds of chlorine and alkali metal fluoride are discontinued, and the reactor is evacuated to approximately 5 mm. pressure. The gas collection system is then isolated from the reactor and the product is transferred, by distillation, to a liquid nitrogen-cooled stainless steel cylinder for subsequent analysis. After the reactor has cooled and has been brought back to atmospheric pressure, the solid reaction product is removed from the graphite liner.

In the specific form of apparatus illustrated in the drawing, the graphite bed preceding the arc is in contact with both electrodes. This arrangement does not short circuit the arc, however, for the reason that the graphite particles are in the form of irregular chips having sharp, pointed edges, thus offering a high resistance path to the passage of electrical current. The arc is ignited by bringing the cathode in contact with the side of the anode sleeve, then lifting the cathode slightly to break the contact sufficiently to establish an arc. The characteristics of the direct current arc are such that it offers a very low resistance path to the current. Thus, once the arc has been formed in the manner described, the current tends to maintain it rather than pass through the graphite bed which has high electrical resistance.

The apparatus just described represents but one suitable type of reactor. Various modifications in form and design can be made without affecting the principle and operation of this process, which does not depend on the specific type of equipment used.

The invention is further illustrated in the example which follows. In this example, the composition of the total gaseous reaction product, without preliminary washing or other purification, was determined by the rapid and accurate method of infrared spectral analysis. This method gives directly, in mole percent, the amount in the reaction product of tetrafluoroethylene, carbon tetrafluoride, chlorotrifluoromethane and other halomethanes, if any, and of impurities such as silicon tetrafluoride or hydrogen chloride, these latter being present only in small or trace amounts.

*Example*

A gas stream composed of chlorine (75 cc. per minute) and nitrogen (50 cc. per minute), both measured at normal temperature and pressure, was fed into a rotating arc tube reactor of the kind described above together with solid sodium fluoride of 40–60 mesh particle size, the latter being introduced at the rate of 2 g. per minute. The reactor contained a bed of hot graphite (150 cc. of 4–8 mesh particles) immediately above the arc zone, and a 2″ long graphite sleeve of ⅝″ inside diameter at and immediately below the arc zone. This in turn was immediately followed by a water-cooled copper quenching element.

The reactor was operated with a direct arc current of 250 amperes at a potential of 15–20 volts, and at a pressure of approximately 40 mm. above the graphite particles and 17 mm. below the quenching element.

The gaseous product collected during 20 minutes of operation was found by infrared analysis to contain, on a molar basis, 15% of tetrafluoroethylene, 25% of carbon tetrafluoride, 30% of chlorotrifluoromethane, 5% of dichlorodifluoromethane, and 1% of 1,2-dichloro-1,1,2,2-tetrafluoroethane, as well as impurities amounting to 10% of hydrogen chloride, 5–10% of carbon dioxide, 1% of thionyl fluoride and less than 5% of silicon tetrafluoride. There was no unreacted chlorine. The conversions and yields, based on the chlorine, were 20% for the tetrafluoroethylene, 26.8% for the carbon tetrafluoride, 39.8% for the chlorotrifluoromethane and 6.6% for the dichlorodifluoromethane.

I claim:

1. A process for preparing tetrafluoroethylene which comprises contacting a mixture of a fluoride of an alkali metal of atomic number 11 to 19 and chlorine, the molar ratio of the alkali metal fluoride to chlorine being in the range of 4:1 to 20:1, with excess carbon maintained at a temperature of at least 1200° C., passing the effluent product at that temperature through a carbon arc, contacting the resulting effluent gas at a temperature above the boiling point of the said alkali metal fluoride with additional carbon and thereafter quenching the effluent gaseous product to a temperature below 500° C. within 0.1 second, said process being carried out at an absolute pressure below 100 mm. mercury.

2. A process for preparing tetrafluoroethylene which comprises contacting a mixture of a fluoride of an alkali metal of atomic number 11 to 19 and chlorine, the molar ratio of the alkali metal fluoride to chlorine being in the range of 4:1 to 20:1 with excess carbon maintained at a temperature of at least 1200° C., passing the effluent product at that temperature through a rotating electric carbon arc, contacting the resulting effluent gaseous product at a temperature above 1700° C. with additional carbon, and thereafter quenching the effluent gaseous products to a temperature below 500° C. within 0.1 second, said process being carried out at an absolute pressure below 100 mm. mercury.

3. The process set forth in claim 2 wherein the alkali metal fluoride is sodium fluoride.

4. The process set forth in claim 2 wherein the reactive carbon is maintained at the elevated temperatures by the rotating arc.

5. A process for preparing tetrafluoroethylene which comprises contacting a mixture of a fluoride of an alkali metal of atomic number 11 to 19 and chlorine, the molar ratio of the alkali metal fluoride to chlorine being in the range of 4:1 to 20:1 with excess carbon at a temperature of at least 1200° C., passing the effluent products through a zone maintained at a temperature of at least 2000° C., contacting the resulting effluent gas at a temperature above the boiling point of the said alkali metal fluoride with additional carbon and thereafter quenching the effluent gaseous product to a temperature below 500° C. within 0.1 second, said process being carried out at an absolute pressure below 100 mm. mercury.

References Cited in the file of this patent

UNITED STATES PATENTS

| | | |
|---|---|---|
| 785,961 | Lyons et al. | Mar. 28, 1905 |
| 2,709,182 | Farlow | May 24, 1955 |
| 2,709,185 | Muetterties | May 24, 1955 |
| 2,709,192 | Farlow | May 24, 1955 |
| 2,725,410 | Farlow et al. | Nov. 29, 1955 |
| 2,852,574 | Denison et al. | Sept. 16, 1958 |